(12) United States Patent
McPhillen et al.

(10) Patent No.: US 9,445,141 B2
(45) Date of Patent: Sep. 13, 2016

(54) EFFICIENT RE-USE OF A MEDIA ASSET

(71) Applicant: Disney Enterprises, Inc., Burbank, CA (US)

(72) Inventors: Jared McPhillen, Glendale, CA (US); Kevin Liao, Rancho Palos Verdes, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 313 days.

(21) Appl. No.: 13/787,654

(22) Filed: Mar. 6, 2013

(65) Prior Publication Data

US 2014/0258345 A1 Sep. 11, 2014

(51) Int. Cl.
| | | |
|---|---|---|
| *G06F 17/30* | (2006.01) | |
| *H04N 21/262* | (2011.01) | |
| *H04N 21/266* | (2011.01) | |
| *H04N 21/845* | (2011.01) | |
| *H04N 21/2343* | (2011.01) | |
| *H04N 21/2368* | (2011.01) | |
| *H04L 29/06* | (2006.01) | |

(52) U.S. Cl.
CPC .. *H04N 21/26258* (2013.01); *G06F 17/30017* (2013.01); *H04N 21/23439* (2013.01); *H04N 21/266* (2013.01); *H04N 21/8456* (2013.01); *G06F 17/3002* (2013.01); *H04L 65/60* (2013.01); *H04N 21/2368* (2013.01); *H04N 21/234309* (2013.01)

(58) Field of Classification Search
CPC ... H04L 65/4084; H04L 65/80; H04L 65/60; H04L 65/608; H04L 65/4069; H04L 67/2823; H04N 21/26258; H04N 21/2402; H04N 21/47202; G06F 21/10; G06F 17/3002; G06F 17/3089
USPC ........ 707/695, 821; 709/217, 219, 223, 224, 709/231, 242; 725/86, 87
See application file for complete search history.

(56) References Cited

U.S. PATENT DOCUMENTS

| | | | |
|---|---|---|---|
| 7,885,981 B2 * | 2/2011 | Kaufman et al. | 707/802 |
| 8,489,760 B2 * | 7/2013 | Visharam et al. | 709/231 |
| 8,527,647 B2 * | 9/2013 | Gopalakrishnan | 709/231 |
| 8,762,452 B2 * | 6/2014 | Forsman | H04N 21/64322 709/203 |
| 8,813,117 B1 * | 8/2014 | Inskip, VI | H04N 7/1675 709/231 |
| 8,949,206 B2 * | 2/2015 | Dhanapal | 707/695 |
| 2011/0296048 A1 * | 12/2011 | Knox et al. | 709/231 |
| 2011/0314130 A1 * | 12/2011 | Strasman | 709/219 |
| 2012/0023251 A1 * | 1/2012 | Pyle | H04N 21/23432 709/231 |
| 2013/0054728 A1 * | 2/2013 | Amir et al. | 709/213 |
| 2013/0080579 A1 * | 3/2013 | Gordon et al. | 709/217 |
| 2014/0025710 A1 * | 1/2014 | Sarto | G06F 17/3002 707/823 |
| 2014/0149557 A1 * | 5/2014 | Lohmar et al. | 709/219 |

* cited by examiner

*Primary Examiner* — Dangelino Gortayo
(74) *Attorney, Agent, or Firm* — Sheppard, Mullin, Richter & Hampton LLP

(57) ABSTRACT

Systems and methods are provided for reusing parts of previously created media assets when creating new media assets. Files created for previous media assets are evaluated when creating a manifest file for a new media asset. If a needed file was previously created, the manifest file for the new media asset references the preexisting file. This avoids the need to recreate files when creating new media assets.

18 Claims, 4 Drawing Sheets

EFFICIENT RE-USE OF A MEDIA ASSET

TECHNICAL FIELD

The present disclosure relates generally to digital media management, and more particularly, some embodiments relate to systems and methods for asset reuse in digital media management systems.

DESCRIPTION OF THE RELATED ART

Adaptive bitrate streaming (ABS) is a technique for streamlining multimedia. In ABS, the content deliverer, such as a content delivery network (CDN), detects a user's bandwidth in real-time and adjusts the bitrate of the streaming multimedia accordingly. The ABS system utilizes multiple versions of the same content, with each version at a different quality level. The bitrate of the streaming multimedia is adjusted by switching between different versions.

A typical collection of files ("asset") for use in an ABS system includes a set of multimedia files and a manifest file. The manifest file contains information about the asset, and can include references to the locations of the multimedia files, DRM authentication information, media bootstrap information, multi-bitrate information, and other asset related information. Some assets may include additional files. For example, each multimedia file may comprise a plurality of media fragments. Each multimedia file may have an associated index file that lists the fragment offsets needed to locate specific fragments within the stream.

BRIEF SUMMARY

Systems and methods are provided for reusing parts of previously created media assets when creating new media assets. Files created for previous media assets are evaluated when creating a manifest file for a new media asset. If a needed file was previously created, the manifest file for the new media asset references the preexisting file. This avoids the need to recreate files when creating new media assets.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

Systems and methods are provided for reusing parts of previously created media assets when creating new media assets. Files created for previous media assets are evaluated when creating a manifest file for a new media asset. If a needed file was previously created, the manifest file for the new media asset references the preexisting file. This avoids the need to recreate files when creating new media assets.

Figure 1:
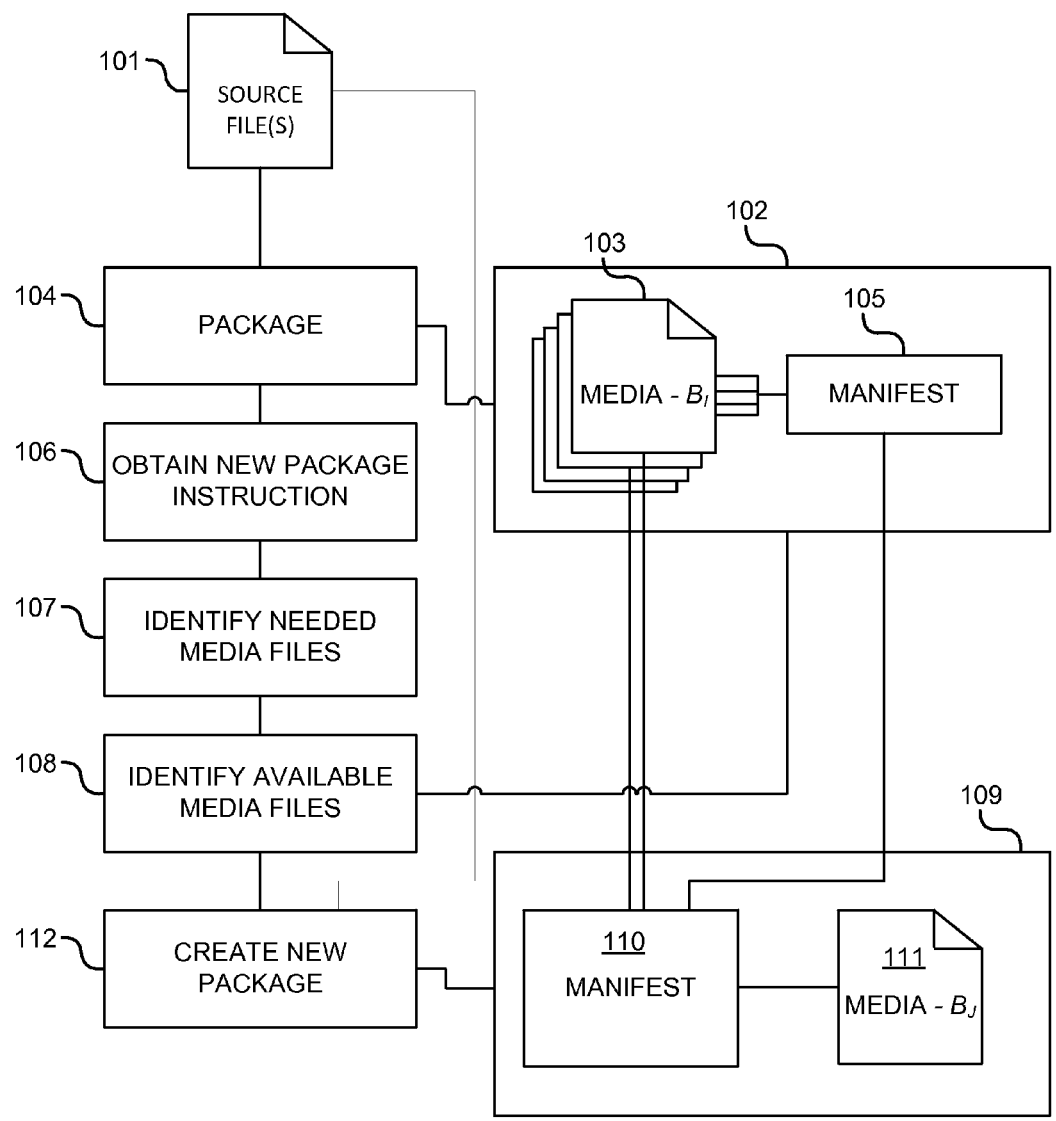
FIG. 1 illustrates an example method of asset reuse.

FIG. 1 illustrate an example method for asset reuse. This method illustrates the operation of a video management system (VMS) used to provide different streaming versions of a single movie. For example, the system user may want to provide one or more standard definition (SD), and one or more high definition (HD) streams. These streams are provided by groups of files having different bitrates but the same content. The files are derived from one more source files 101. For example, a source file 101 may be an original high-quality copy of a piece of content, such as a mezzanine file. Transcodes of the source file 101 at different bitrates may be made to provide the desired streams.

As another example, the source files 101 may comprise transcodes at different bitrates of another source file. For example, Table 1 illustrates an example set of source files 101 derived from a piece of content titled "SAMPLE":

TABLE 1

Example Source Files

| Number | File Name | Dimensions | Bitrate (Kb/s) | Class | Tags |
|---|---|---|---|---|---|
| 1 | SAMPLE_1400k.mp4 | 852 × 480 | 1400 | SD | unencrypted |
| 2 | SAMPLE_2600k.mp4 | 1280 × 720 | 2600 | HD | unencrypted |
| 3 | SAMPLE_5000k.mp4 | 1920 × 1080 | 5000 | HD_plus | unencrypted |

This example set of source files 101 includes three unencrypted MP4 multimedia files of a piece of content, SAMPLE, at three different resolutions and bitrates. Sample file 1 is an SD video with a bitrate of 1400 Kb/s, sample file 2 is an HD (e.g., 720p) file with a bitrate of 2600 Kb/s, and sample file 3 is an HD (e.g, 1080p) file with a bitrate of 5000 Kb/s.

The method begins by packaging 104 one or more source files 101 to create a first digital media asset 102. The step of packaging 104 may also comprise uploading the media asset 102 onto a content delivery network (CDN). If the source file 101 is a single content file, such as a mezzanine file, then the step of packaging 104 may include transcoding the file to produce a set of files at different bitrates, as exemplified by Table 1. The step of packaging 104 the source files 101 further comprises encrypting the transcodes or the source files 101 to create a set of encrypted media files 103. The step of packaging 104 the source files 101 may also include fragmenting the source files 101 so that the media files 103 are fragmented. In such a case, the media asset 102 may also comprise a corresponding set of associated index files that list the fragment offsets needed to locate specific fragments within the stream.

The step of packaging 104 further comprises creating a manifest file 105. The manifest file 105 is used by the CDN to stream the media asset 102. The manifest file 105 comprises references to the locations of the media files 103. The manifest file may include further information, such as metadata, bitrate information, license server locations, and bootstrap information for the group of media files 103 or for individual files 103.

Table 2 provides an example media asset 102 that might be created from the source files 101 provided in Table 1:

TABLE 2

Example media asset for HD_plus stream.

| Number | File Name | Dimensions | Bitrate (Kb/s) | Class | Tags |
|---|---|---|---|---|---|
| 1 | SAMPLE_1400k.f4f | 852 × 480 | 1400 | SD | encrypted |
| 2 | SAMPLE_1400k.f4x | 852 × 480 | 1400 | SD | encrypted |
| 3 | SAMPLE_2600k.f4f | 1280 × 720 | 2600 | HD | encrypted |
| 4 | SAMPLE_2600k.f4x | 1280 × 720 | 2600 | HD | encrypted |
| 5 | SAMPLE_5000k.f4f | 1920 × 1080 | 5000 | HD_plus | encrypted |
| 6 | SAMPLE_5000k.f4x | 1920 × 1080 | 5000 | HD_plus | encrypted |
| 7 | SAMPLE_5000K.f4m | 1920 × 1080 | 5000 | HD_plus | encrypted |

The example media asset 102 of Table 2 is adapted to allow a CDN to stream a high resolution HD stream (e.g., 1080p) to consumers. This example uses files compatible with Adobe Access and Flash media streaming. To provide the high resolution HD stream, the asset includes a fragmented and encrypted media file 103, SAMPLE_5000K.f4f, and associated index file, SAMPLE_5000K.f4x. To provide ABS, the asset also includes lower resolution and media files 103, SAMPLE_2600k.f4f and SAMPLE_1400k.f4f, and their associated index files, SAMPLE_2600k.f4x and SAMPLE_1400k.f4x. The manifest file 105 SAMPLE_5000K.f4m includes references to these files along with any relevant metadata or other manifest file parameters.

After creating the media asset 102, the system obtains an instruction to create a new media asset package 106 for the source file 101. For example, the instruction 106 may be to create a new media asset having a higher maximum bitrate for a premium steam or a lower maximum bitrate for a handheld device.

In step 107, the system identifies what bitrates will be needed for media files in the new media asset package. In step 108, the system identifies what the bitrates of available media files 103 are. For example, the system may inspect previously created media assets 102 to determine the properties of preexisting media files 103. The inspection of the previously created media assets 102 may comprise inspecting preexisting manifest files 105. As another example, the system may store a database of the properties of preexisting media files 103. The step 108 of identifying available media files may comprise inspecting the database to determine if preexisting media files 103 have the needed bitrates.

In step 112, the system creates the new media asset package 109 that was requested in the instruction received in step 106. The system creates 112 the new media asset package 109 by writing a manifest file 110 that includes references to the needed preexisting media files 103. In some implementations, the needed preexisting media files 103 are the intersection of the set of needed files identified in step 107 and the set of preexisting media files 103 identified in step 108. If the complement of the set of preexisting media files 103 is nonempty, then the step of creating the new media asset package 109 further comprises creating a media file 111 that is in the complement of the set of preexisting media files in the set of media files. In further implementations, the step of creating the new media asset package 109 comprises inspecting previous manifest files 105 to include metadata from the previous manifest files 105 in the new manifest file 110. For example, the metadata from the previous manifest files 105 may comprise bootstrap information for the referenced preexisting media files 103.

Figure 2:
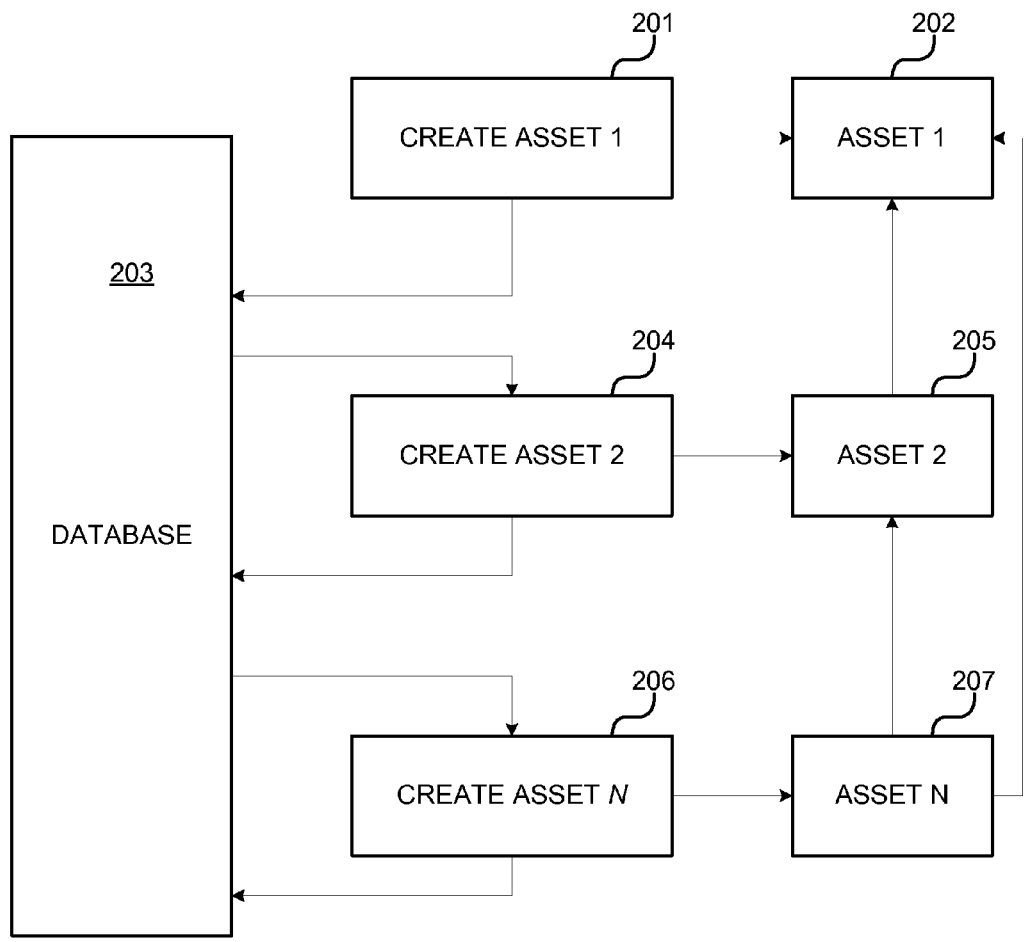
FIG. 2 illustrates a second example of asset reuse.

FIG. 2 illustrates a database-assisted method of asset reuse. In this implementation, when the system creates 201 a first asset 202, various information related to the asset 202 is stored in a database 203. For example, the information stored in the database 203 may comprise information related to the media files in asset 202, such as bitrate, location, and location information of associated index files. The information stored in the database 203 may also include information related to the manifest file in asset 202, such as location and bootstrap information.

When a second asset 205 is created 204, the database 203 is queried to determine if media files needed for the second asset 205 are available. If the needed files are available in a previous asset 202, then the asset 205 references the files from the previous asset 202. If subsequent assets 207 are created 206, the data base may be used to determine if one or more previous assets 205, 202 contain the needed files for the subsequent asset 207. The subsequent asset 207 may then reference previous files from multiple previous assets 205, 202.

Figure 3:
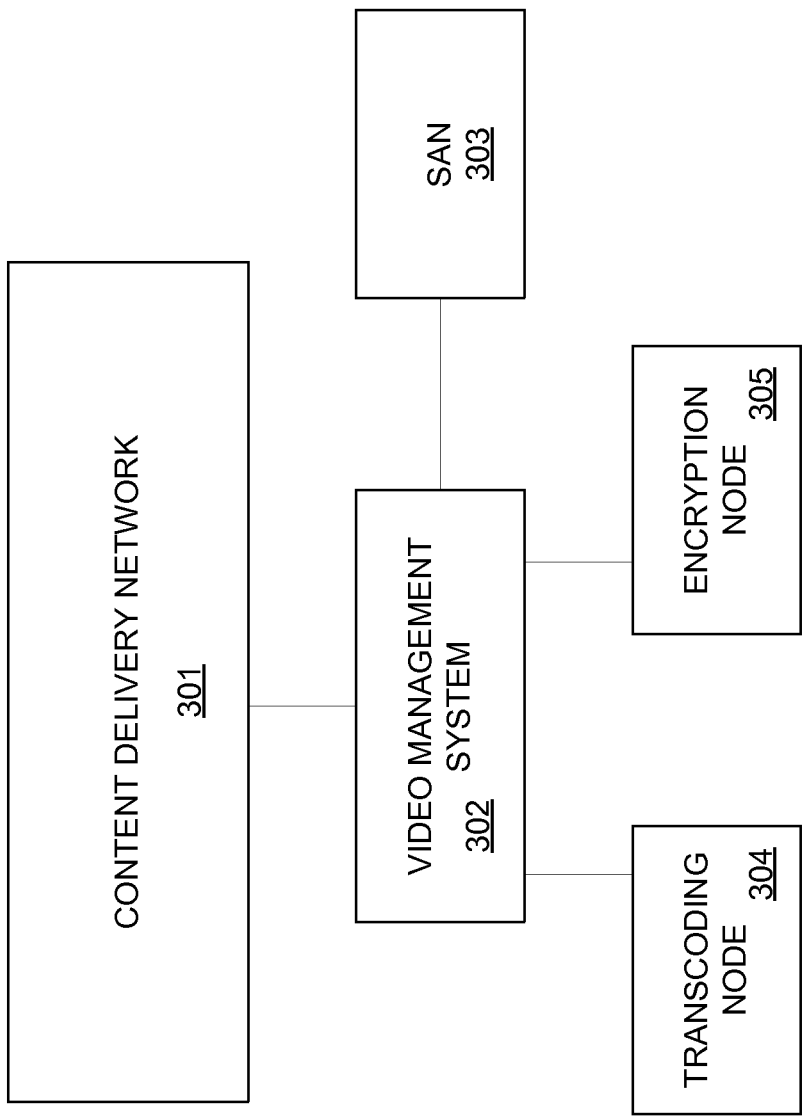
FIG. 3 illustrates a video management system and associated network.

FIG. 3 illustrates a video management system and associated network. The video management system 302 is coupled to a content delivery network 301 that provides media assets to consumers. When the system management 302 creates a new asset, that asset may be uploaded to the content delivery network 301 for delivery to consumers. The management system 302 may be further coupled to network storage, such as a storage area network (SAN) 303. The SAN may be used to store original source files used to create assets, and to store files in the interim while assets are being created. The management system 302 may be further coupled to various asset creation nodes 304, 305. For example, the management system 302 may be coupled to one or more transcoding nodes 304 that create compressed files at various needed bitrates for use in creating a media asset. The management system 302 may further comprise one or more encryption nodes 305 that encrypt media files and create associated index files. In some implementations, the encryption nodes 305 are further configured to create manifest files for the media assets. In other implementations, the manifest files are created by the video management system 302.

Figure 4:
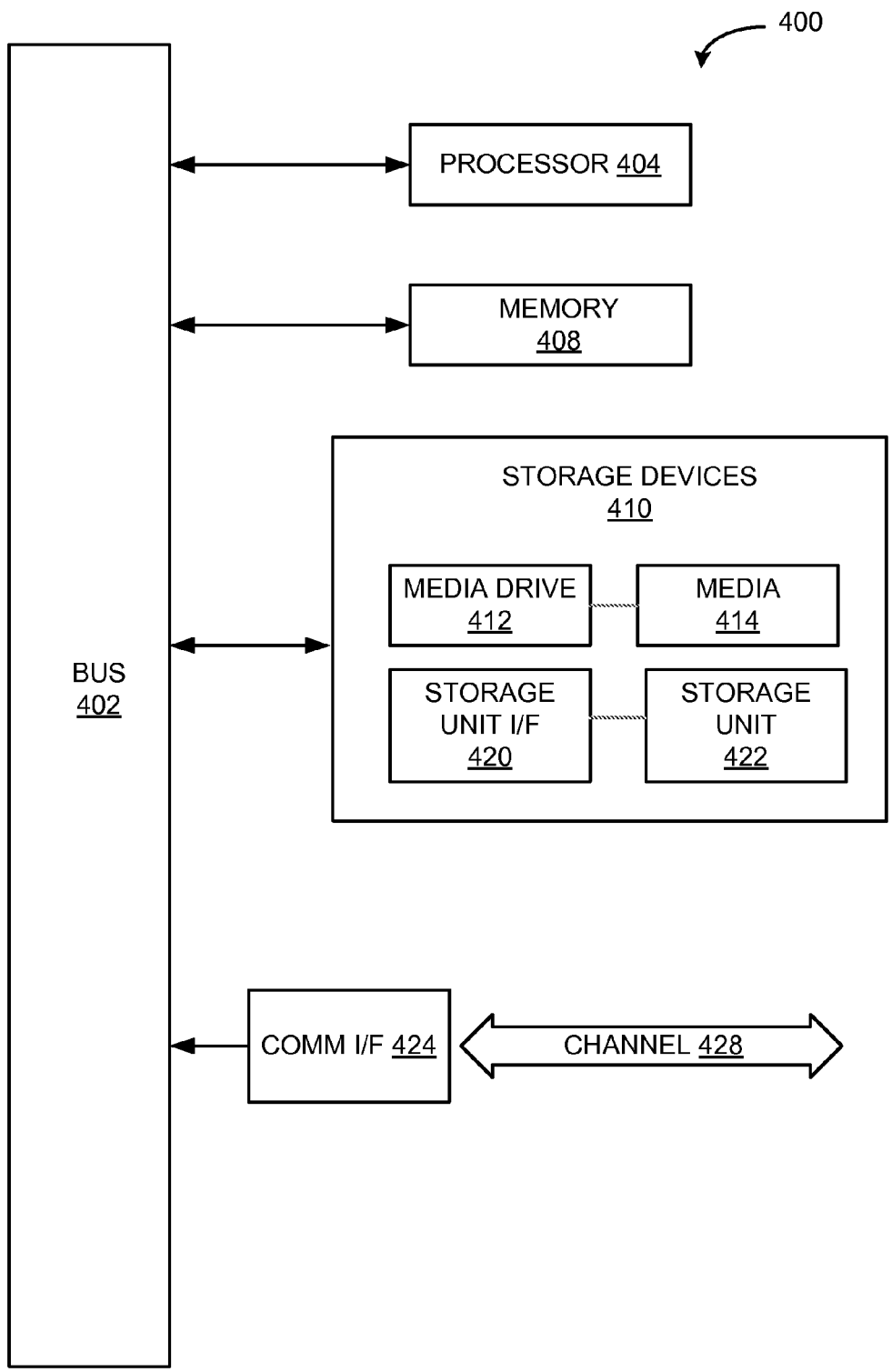
FIG. 4 illustrates an example computing module that may be used in implementing various features of the disclosure.

As used herein, the term module might describe a given unit of functionality that can be performed in accordance with one or more implementation. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the disclosure using other computing modules or architectures.

Referring now to FIG. 4, computing module 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. Memory may include any non-transitory storage medium. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 422, and media 414. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although described above in terms of various exemplary embodiments and implementations, it should be understood that the various features, aspects and functionality described are not limited in their applicability to the particular embodiment with which they are described, but instead can be applied, alone or in various combinations, to one or more of the other embodiments, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method, comprising:
obtaining an instruction to create a new media asset package from one or more source files, the new media asset package comprising a manifest file specific to the new media asset package referencing a set of required media files for the new media asset package having corresponding required bitrates;
determining an intersection of the set of required media files with a set of preexisting media files of one or more preexisting media asset packages, the preexisting media files having corresponding preexisting bitrates, and each preexisting media asset package having a preexisting manifest file;
determining a complement of the set of preexisting media files in the set of required media files for the new media asset package and creating a media file that is in the complement of the set of preexisting media files in the set of required media files for the new media asset package; and
creating the new media asset package, wherein creating the new media asset package comprises writing the manifest file specific to the new media asset package to reference media files from the set of preexisting media files of the one or more preexisting media asset packages that are in the intersection and the created media file.

2. The method of claim 1, wherein the step of creating the media file comprises encrypting an unencrypted media file.

3. The method of claim 1, wherein the step of creating the media file comprises transcoding a source media file.

4. The method of claim 1, further comprising obtaining the references to the set of media files from a preexisting manifest file.

5. The method of claim 4, further comprising obtaining metadata for the manifest file from the preexisting manifest file.

6. The method of claim 5, wherein the metadata comprises bootstrap information.

7. The method of claim 1, further comprising obtaining the references to the set of media files from a plurality of preexisting manifest files.

8. A non-transitory computer readable medium, comprising computer executable code configured to cause a computer system to perform the steps of:
obtaining an instruction to create a new media asset package from one or more source files, the new media asset package comprising a manifest file specific to the new media asset package referencing a set of required media files for the new media asset package having corresponding required bitrates;
determining an intersection of the set of required media files with a set of preexisting media files of one or more preexisting media asset packages, the preexisting media files having corresponding preexisting bitrates, and each preexisting media asset package having a preexisting manifest file;

determining a complement of the set of preexisting media files in the set of required media files for the new media asset package and creating a media file that is in the complement of the set of preexisting media files in the set of required media files for the new media asset package; and creating the new media asset package, wherein creating the new media asset package comprises writing the manifest file specific to the new media asset package to reference media files from the set of preexisting media files of the one or more preexisting media asset packages that are in the intersection and the created media file.

9. The non-transitory computer readable medium of claim 8, wherein the step of creating the media file comprises encrypting an unencrypted media file.

10. The non-transitory computer readable medium of claim 8, wherein the step of creating the media file comprises transcoding a source media file.

11. The non-transitory computer readable medium of claim 8, wherein the computer executable code is further configured to cause the computer system to perform the step of obtaining the references to the set of media files from a preexisting manifest file.

12. The non-transitory computer readable medium of claim 11, wherein the computer executable code is further configured to cause the computer system to perform the step of obtaining metadata for the manifest file from the preexisting manifest file.

13. The non-transitory computer readable medium of claim 12, wherein the metadata comprises bootstrap information.

14. The non-transitory computer readable medium of claim 8, wherein the computer executable code is further configured to cause the computer system to perform the step of obtaining the references to the set of media files from a plurality of preexisting manifest files.

15. A computer system, comprising:
a processor;
a memory; and
computer executable code stored on the memory, the computer executable code configured to cause the computer system to perform the steps of:
  obtaining an instruction to create a new media asset package from one or more source files, the new media asset package comprising a manifest file specific to the new media asset package referencing a set of required media files for the new media asset package having corresponding required bitrates;
  determining an intersection of the set of required media files with a set of preexisting media files of one or more preexisting media asset packages, the preexisting media files having corresponding preexisting bitrates, and each preexisting media asset package having a preexisting manifest file;
  determining a complement of the set of preexisting media files in the set of required media files for the new media asset package and creating a media file that is in the complement of the set of preexisting media files in the set of required media files for the new media asset package; and
  creating the new media asset package, wherein creating the new media asset package comprises writing the manifest file specific to the new media asset package to reference media files from the set of preexisting media files of the one or more preexisting media asset packages that are in the intersection and the created media file.

16. The computer system of claim 15, wherein the step of creating the media file comprises encrypting an unencrypted media file or transcoding a source media file.

17. The computer system of claim 15, wherein the computer executable code is further configured to cause the computer system to perform the step of obtaining the references to the set of media files from a preexisting manifest file.

18. The computer system of claim 17, wherein the computer executable code is further configured to cause the computer system to perform the step of obtaining metadata for the manifest file from the preexisting manifest file.

* * * * *